June 26, 1951  D. COHN ET AL  2,558,237
DOLL VOICE MECHANISM
Filed March 1, 1946

INVENTORS
DAVID COHN
CHARLES KUSOLD
BY James and Franklin
ATTORNEYS

Patented June 26, 1951

2,558,237

UNITED STATES PATENT OFFICE 2,558,237

DOLL VOICE MECHANISM

David Cohn, Brooklyn, and Charles Kusold, Ridgewood, N. Y., assignors to Voices, Inc., Newark, N. J., a corporation of Delaware Application March 1, 1946, Serial No. 651,236

16 Claims. (Cl. 46—187)

This invention relates to sound-producing devices, especially gravity-operated sound-producing devices for dolls.

The primary object of the present invention is to generally improve such devices.

More particular objects are to increase the volume of air displacement for a particular outside dimension; to cheapen the cost of manufacture; to reduce the percentage of rejects or defective units during manufacture; and to improve the operation of the device. To accomplish these objects we have devised a construction which eliminates the conventional cloth bellows, and substitutes a piston action. The latter change had been suggested in the patent literature, but has not been accomplished successfully. The structural features hereinafter described have proved successful both operationally and commercially.

A further object of the present invention is to make it possible to use an inexpensive, rough and inaccurate cardboard tube as the main cylinder. To do this we use a weighty piston loosely slidable in the cylinder but equipped with a gasket which is made of a thin flexible non-porous sheet material (for example, rubber cloth, made of nainsook or cambric with a thin film of rubber calendered on one side thereof). Such a gasket, particularly when mounted as is later described, functions successfully with even a rough cardboard tube having the conventional rather open spiral seams. To insure a circular section for the tube, and to strengthen the entire unit against rough and abusive handling the cardboard cylinder is provided with sheet metal end caps which have cylindrical portions snugly fitting within the cylinder to shape and support the same, the edges of said caps being curled around the ends of the cylinder and pressed into the outside of the cylinder opposite the aforesaid cylindrical portions.

Still another object of the invention is to so arrange the piston and gasket that the piston moves slowly in one direction and rapidly in the other. In this way a long drawn out sound may be produced, while the weighty piston moves in one direction, yet the return movement is rapid when the device is inverted, thus preparing the device immediately for renewed operation.

Still another object of the invention is to apply the same to articulative voices or so-called "mama" and "papa" voices, as well as simple "criers."

To accomplish the foregoing objects, and other more specific objects which will hereinafter appear, our invention resides in the sound-producing elements and their relation one to the other as are hereinafter more particularly described in the following specification, and sought to be defined in the appended claims. The specification is accompanied by a drawing, in which:

Figure 1:
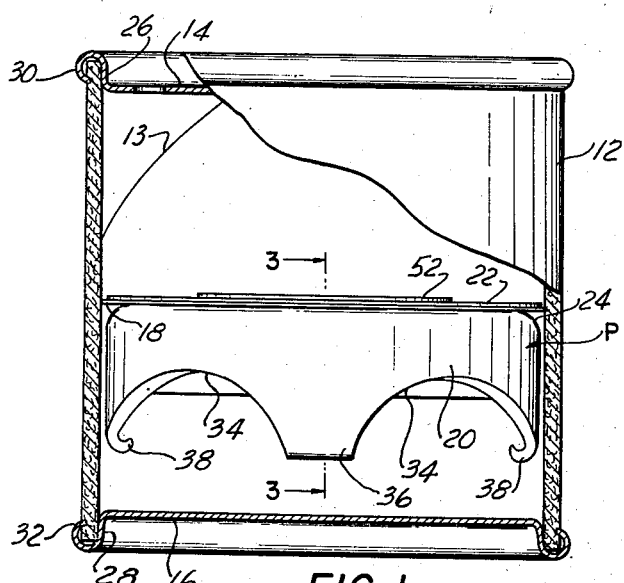
Fig. 1 is a partially sectioned elevation of a crier embodying features of our invention.
Figure 2:
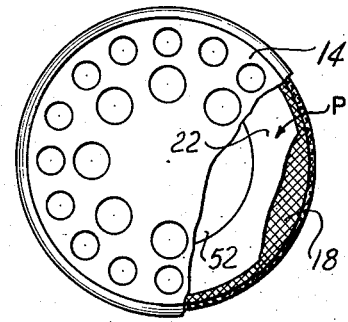
Fig. 2 is a partially sectioned plan view of the same.
Figure 4:
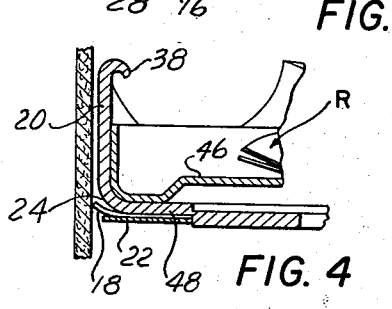
Fig. 4 is a fragmentary section illustrating the return movement of the piston.
Figure 3:
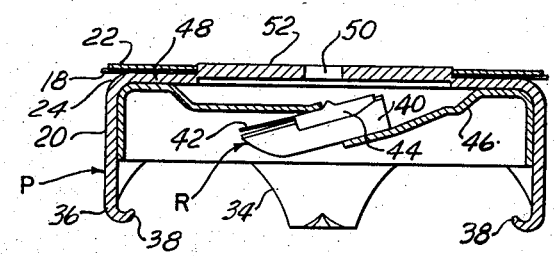
Fig. 3 is a section through the weighty piston of the crier shown in Figs. 1 and 2.

Referring to the drawing, and more particularly to Figs. 1 through 4, the sound-producing device there shown comprises a cylinder 12 having end caps 14 and 16, the cap 14 being perforate, and the cap 16 being imperforate. There is also a weighty piston generally designated P which is loosely slidable in cylinder 12 and which carries a reed assembly R (Fig. 3). The piston has a flat circular gasket 18 which is made of a thin flexible non-porous fabric and which may have a diameter only slightly greater than the inside diameter of the cylinder 12. The piston comprises a piston body 20 and support washer 22 between which the gasket 18 is held. The body 20 is preferably provided with a relieved edge 24 at the head end. The washer 22 is disposed in back of the gasket and has a diameter only slightly smaller than the diameter of the gasket. Its diameter is preferably no smaller than the diameter of the body 20, and may even be, and preferably is, slightly larger in diameter. With this arrangement the gasket is supported by the washer 22 during the sound-producing movement of the piston, that is, during the downward movement in the piston shown in Figs. 1 and 3. This results in a slow descent of the piston toward the imperforate end. However, when the device is inverted for return movement, as shown in Fig. 4, the gasket 18 is free to fold about the relieved edge 24 of the body 20, thereby relieving the air sealing action and affording rapid return movement toward the perforate end of the sound-producing device. The edge 24 is most conveniently relieved by rounding it, as shown.

The cylinder 12 is preferably an inexpensive cardboard tube. Such a tube is relatively rough in surface, inaccurate in shape and dimension and usually has a spiral seam (indicated at 13 in Fig. 1) because it is made of multiple spirally-wound laminations. In accordance with the present invention the carboard tube is supported in proper shape and dimension by the end caps 14 and 16. These caps are made of sheet metal, drawn or cupped to provide cylindrical portions 26 and 28 (Fig. 1) which fit within the cylinder to support the same. The edges 30 and 32 of the end caps are curled around the ends of the cylinder and into the outside of the cylinder opposite the cylindrical portions 26 and 28. These edges may be forced into the cardboard, thus securely anchoring the end caps in position, yet there is no danger of warping or deforming the cylinder because it is supported by the cylindrical parts 26 and 28.

Considering the arrangement in greater detail, the piston body 20 in the present case is formed of heavy gauge metal drawn to cup shape. A circular blank may be used, but in the present case a square blank has been used in order to avoid waste of metal and to take advantage of the extra weight of the corners. When this blank is drawn to cup shape the bottom edge is scalloped, as indicated at 34, but the deeper parts 36 effectively guide the piston, and the lowermost corners are curled inwardly, as shown at 38, to avoid any danger of catching against the inside wall of the cylinder, and to limit the height of the piston to desired dimension.

The reed assembly R may be conventional, and requires no detailed description except to say that there is a metal channel 40 having a thin vibratile reed 42 clamped at one end of the open face of the channel by means of a metal clip 44. In the present case, this reed assembly is secured in an opening in a sheet metal reed holder 46, the latter being forced within the body 20 before the ends 38 are curled in. The reed assembly may be sealed in place with wax or cement. The head end 48 of the piston body 20 is provided with a sound discharge aperture 50, thus permitting air to flow through the reed assembly, and aperture 50, to the perforate end 14 of the casing.

To secure the gasket 18 and washer 22 in proper concentric relation with the body 20, in an inexpensive manner, a circular area of the heavy gauge metal of the head 48 is partly sheared and displaced outwardly as indicated at 52. The gasket 18 is annular in shape and fits accurately around the upwardly projecting part 52, and the washer 22 is forced thereover with a force fit which locks the parts permanently together. Washer 22 is preferably made of thin sheet metal for economy, and even if it were thicker it would preferably be thinned at its edge in order not to interfere with a slight swaying or self-adjusting movement of the piston as it descends in the cylinder.

The gasket 18 may be made of a thin flexible non-porous material, for example, so-called "rubber cloth." In that form it consists of a very thin light-weight open-mesh fabric, such as nainsook or cambric, with a thin layer of rubber calendered onto one side of the fabric. The rubber side is preferably on bottom, when viewed as in Figs. 1 and 3. This has a frictional or almost clinging contact on the way down, but the fabric side has a smooth non-clinging contact on the return movement. This is in addition to the change in the air sealing action previously mentioned, which would occur even with a sheet material having both sides alike. We have found that such a thin fabric, supported as here shown, works successfully inside an ordinary cardboard tube. The diameter of the gasket may be slightly larger than the inside diameter of the tube, say fifteen thousandths of an inch. This, however, is so slight that the gasket is in a non-cupped or flat condition, such that the free edge of the gasket is a substantially flat as well as thin edge which is free to yield to either side of the plane of the main body of the gasket.

Figure 6:
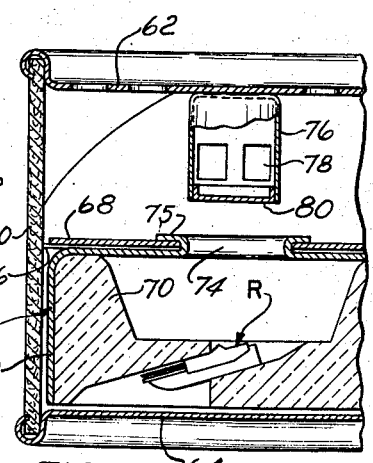
Fig. 6 is a similar section taken through a modification which, in the case illustrated, is arranged to act as a "mama" voice.

The sound-producing device so far described is devoid of any valve means to modulate the sound. A simple wailing sound is produced. Such a non-articulative device is commonly called a "crier." An articulative device of the so-called "mama" type is shown in Fig. 6. This modification of the invention also illustrates how the weighty piston may be constructed in a manner quite different from that described in connection with Fig. 1, even if used for a crier.

Referring to Fig. 6, the sound-producing device, as before, comprises a cylinder 60 having a perforate sheet metal end cap 62 and an imperforate sheet metal end cap 64, both caps having cylindrical portions fitting within the cylinder 60 to support the same, and having edges curler around the ends of the cylinder and into the outside of the cylinder opposite the cylindrical portions. There is also a weighty piston assembly P' carrying a reed assembly R, and having a piston body and a thin flexible gasket 66 backed by a metal washer 68. In the present case the piston body is made up of a solid mass 70 of a porcelain-like material, for example, barium sulphate bonded with an inorganic binder. This is molded to shape, and includes a passage within which the reed assembly R is cemented. The body 70 is received within and protectively housed by a sheet metal shell 72, the head end of which has an opening 74. The metal around said opening is curled outwardly at 75 and clamped against the washer 68.

As so far described the sound-producing device would be a crier, but the opening or ring 74 is dimensioned to cooperate with a stationary valve member 76 secured to the perforate end 62. The valve member 76 has a cylindrical wall with apertures at 78, and is closed at 80. Assuming the weight is at the top, and descending, it will be seen that the sound discharge will be constricted while the ring 74 surrounds the imperforate upper end of valve member 76. This will simulate the consonant "m." The sound discharge will be free when the ring 74 surrounds the passages 78, and the vowel "a" will be simulated. When the ring 74 surrounds the closed or imperforate end of the valve member 76, the sound discharge will again be constricted, and the consonant "m" will again be simulated. After the ring 74 leaves the lower end of the valve member 76 the sound discharge will again be free and unobstructed, and the vowel "a" will again be simulated. In all, the word "mama" will be produced.

Figure 5:
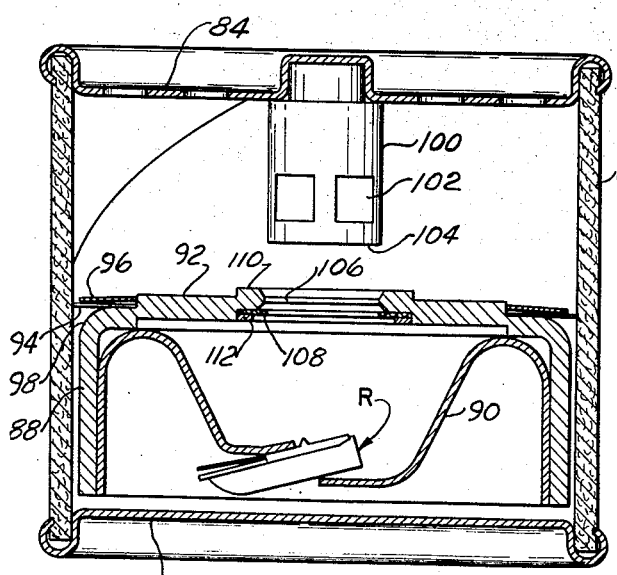
Fig. 5 is a section similar to Fig. 1 taken in elevation through a "papa" voice embodying features of our invention.

The sound-producing device shown in Fig. 5 is still another modification employing the same generic features, but modified structurally to articulate the word "papa." As before, the casing comprises a cardboard cylinder 82 with a perforate sheet metal end cap 84, and an imperforate sheet metal end cap 86, these being secured to cylinder 82 as previously described. The weighty piston has a body 88 formed in this case of a circular blank of heavy metal drawn to cup shape. The reed assembly R is cemented in a sheet metal reed holder 90 received in body 88 with a force fit. A circular portion 92 of the head end of the body is partially sheared and displaced upwardly to provide a shoulder around which a thin flexible gasket 94 made of non-porous fabric is received, as well as a sheet metal washer 96 for supporting the gasket. As before, the body 88 fits the cylinder loosely; the gasket 94 is slightly larger in diameter than the cylinder, and the washer 96 is a little smaller in diameter than the gasket, but preferably no smaller than, and even slightly larger in diameter than the body 88. The upper edge of the body is cut away or relieved, most conveniently by rounding it on a relatively large radius, as indicated at 98.

As so far described the sound-producing device is non-articulative, but it is additionally provided with a hollow cylindrical valve member 100, apertured at 102, and closed at its lower end 104. This cooperates with a ring 106 which fits slidably around the valve member 100. With a free fit the word "mama" would be produced. In the present case the valve mechanism is intended to simulate the word "papa," but to produce the consonant "p" requires a very sharp cut-off of sound. In other words, the ring 106 would have to fit the valve member 100 very snugly, but such precision cannot be attained within the low cost and poor materials of which the present device must be made for competitive purposes. Instead, the ring 106 is made to fit the valve member 100 very loosely, and is equipped with a thin flexible gasket 108, preferably made of the same thin non-porous fabric previously described for the main piston gasket.

In the present case a smaller circular area 110 of the head end of body 88 is partly sheared and displaced outwardly relative to the part 92, and gasket 108 is placed within the resulting hollow beneath the displaced head portion 110. An anchor ring 112 is pressed into the resulting space beneath the gasket 108 and locks the outer edge of the gasket in position. The inner end is left free to bend in either direction, and in this respect differs from the main piston gasket 94, which is much freer to bend during return movement of the piston than during its sound-producing movement.

It is believed that the construction and operation of our improved sound-producing device, as well as the many advantages thereof, will be apparent from the foregoing detailed description. The air volume displaced through the reed is larger than when using a conventional bellows, for there is no lost volume of air around the outside of a frusto-conical bellows. The present device is economical to manufacture because it is unnecessary to make the frusto-conical bellows, nor to cement one end of the same to a weighty head, nor to secure the opposite end to the casing, all with leakproof seams. The present device employs a cardboard tube much as before, but the tube is shaped, dimensioned and strongly supported by the sheet metal ends. These are not clamped solely against the outside of the tube, which might deform the tube, but fit within the tube more deeply than the curled edges pressing against the outside. The number of rejections during manufacture is greatly reduced from the relatively high ten percent which occurred when making the bellows-type sound-producing device (because of leakage at one point or another in the bellows construction). The finished device is able to withstand rough and abusive handling. In operation a long sustained sound is produced by a relatively slow movement of the piston, yet there is a rapid return movement when the device is inverted. The generic features of the invention are adaptable to "mama" and "papa" voices, as well as "criers."

It will be understood that while we have shown and described our invention in several preferred forms, changes may be made in the structures disclosed, without departing from the spirit of the invention, as sought to be defined in the following claims.

We claim:

1. A sound-producing device comprising a cylinder with end caps, one of said caps being imperforate and the other perforate, and a weighty piston slidable in said cylinder and carrying a reed assembly, said piston having a body, a gasket, and a support washer, said body fitting said cylinder loosely and having a relieved edge at the head end nearer the perforate cap, the gasket being mounted on said head end and having a diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, said support washer being disposed in back of said gasket and having a diameter only slightly smaller than that of the gasket, the arrangement being such that the gasket is supported by the washer during sound-producing movement of the piston, resulting in a slow descent of the piston toward the imperforate end, and the gasket is free to bend at the relieved edge of the body for rapid movement toward the perforate end.

2. A sound-producing device comprising a cardboard cylinder with sheet metal end caps, said caps having cylindrical portions fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a gasket, and a support washer, said body fitting said cardboard cylinder very loosely and having a relieved edge at the end nearer the perforate cap, the gasket being mounted on said head end and having a diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, and said support washer being disposed in back of said gasket and having a diameter only slightly smaller than that of the gasket.

3. A sound-producing device comprising a cardboard cylinder with sheet metal end caps, said caps having cylindrical portions fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a gasket, and a support washer, said body fitting said cardboard cylinder very loosely and having a well-rounded edge at the head end nearer the perforate cap, the gasket being mounted on said end and having a diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, said support washer being disposed in back of said gasket and having a diameter only slightly smaller than that of the gasket and no smaller than the diameter of the body, the arrangement being such that the gasket is supported by the washer during sound-producing movement of the piston, resulting in a slow descent of the piston toward the imperforate end, and the gasket is free to fold about the rounded edge of the body for rapid movement toward the perforate end.

4. A sound-producing device comprising a cardboard cylinder with end caps, one of said caps being imperforate and the other perforate, and a weighty piston slidable in said cylinder and carrying a reed assembly, said piston having a body, a reed assembly, a gasket, and a support washer, said body being formed of heavy gauge metal drawn to cup shape, a thin sheet metal reed holder for said reed assembly within said cup-shaped body, said body fitting said cardboard cylinder very loosely and having a portion shear-displaced outwardly, the gasket being mounted around said shear-displaced portion outside said body and having an outer diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, and a thin metal support washer disposed around said displaced portion in back of said gasket, said support washer having a diameter only slightly smaller than that of the gasket.

5. A sound-producing device comprising a cardboard cylinder with end caps, one of said caps being imperforate and the other perforate, and a weighty piston slidable in said cylinder and carrying a reed assembly, said piston having a body, a reed assembly, a gasket, and a support washer, said body being formed of a square piece of heavy gauge metal drawn to cup shape, a thin sheet metal reed holder securing said reed assembly within said cup-shaped body, the corners of said body being curled inward, said body fitting said cardboard cylinder very loosely and having a well-rounded edge at the head end nearer the perforate cap, said head end having a circular portion shear-displaced outwardly, the gasket being mounted around said shear-displaced portion and having an outer diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, a thin metal support washer disposed around said displaced portion in back of said gasket, said support washer having a diameter only slightly smaller than the diameter of the gasket, the arrangement being such that the gasket is supported by the washer during sound-producing movement of the piston, resulting in a slow descent of the piston toward the imperforate end, and the gasket is free to fold about the rounded edge of the body for rapid movement toward the perforate end.

6. A sound-producing device comprising a cardboard cylinder with sheet metal end caps, said caps having cylindrical portions fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a reed assembly, as gasket, and a support washer, said body being formed of heavy gauge metal drawn to cup shape, a thin sheet metal reed holder within said cup-shaped body, said body fitting said cardboard cylinder very loosely and having a circular portion shear-displaced outwardly, the gasket being mounted around said shear-displaced portion and having an outer diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, a thin metal support washer disposed around said displaced portion in back of said gasket, said support washer having a diameter only slightly smaller than the diameter of the gasket.

7. A sound-producing device comprising a cardboard cylinder with sheet metal end caps, said caps having cylindrical portions fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a gasket, and a support washer, said body being formed of a square piece of heavy gauge metal drawn to cup shape, a thin sheet metal reed holder securing said reed assembly within said cup-shaped body, the corners of said body being curled inward, said body fitting said cardboard cylinder very loosely and having a well-rounded edge at the head end nearer the perforate cap, said head end having a circular portion shear-displaced outwardly, the gasket being mounted around said shear-displaced portion and having an outer diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, a thin metal support washer disposed around said displaced portion in back of said gasket, said support washer having a diameter only slightly smaller than that of the gasket and no smaller than the diameter of the body, the arrangement being such that the gasket is supported by the washer during sound-producing movement of the piston, resulting in a slow descent of the piston toward the imperforate end, and the gasket is free to fold about the rounded edge of the body for rapid movement toward the perforate end.

8. A sound-producing device comprising a cardboard cylinder with end caps, one of said caps being imperforate and the other perforate, and a weighty piston slidable in said cylinder and carrying a reed assembly, said piston having a body, a reed assembly, a gasket, and a support washer, said body being made of solid composition enclosed within a thin sheet metal shell having a head end and a cylindrical skirt portion, said body fitting said cardboard cylinder loosely, said gasket being mounted on said head end and having a diameter only slightly greater than that of the cylinder, said gasket being made of very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than the diameter of the gasket, the head end of said shell being flanged outwardly at the center to hold the gasket and support washer.

9. A sound-producing device comprising a cardboard cylinder with end caps, one of said caps being imperforate and the other perforate, and a weighty piston slidable in said cylinder and carrying reed assembly, said piston having a body, a reed assembly, a gasket, and a support washer, said body being made of solid composition enclosed within a thin sheet metal shell having a head end and a cylindrical skirt portion, said body fitting said cardboard cylinder loosely and having a well-rounded edge at the head end nearer the perforate cap, said gasket being mounted on said head end and having a diameter only slightly greater than that of the cylinder, said gasket being made of very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than that of the gasket and no smaller than the diameter of the body, the head end of said shell being flanged outwardly at the center to hold the gasket and support washer, the arrangement being such that the gasket is supported by the washer during sound-producing movement of the piston, resulting in a slow descent of the piston toward the imperforate end, and the gasket is free to fold about the rounded edge of the body for rapid movement toward the perforate end.

10. A sound-producing device comprising a cardboard cylinder with sheet metal end caps, said caps having cylindrical portions fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a gasket, and a support washer, said body being made of solid composition enclosed within a thin sheet metal shell having a head end and a cylindrical skirt portion, said body fitting said cardboard cylinder loosely and having a well-rounded edge at the head end nearer the perforate cap, said gasket being mounted on said head end and having a diameter only slightly greater than that of the cylinder, said gasket being made of very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than that of the gasket and no smaller than the diameter of the body, the head end of said shell being flanged outwardly at the center to clamp the gasket and support washer to the head end of the body, the arrangement being such that the gasket is supported by the washer during sound-producing movement of the piston, resulting in a slow descent of the piston toward the imperforate end, and the gasket is free to fold about the rounded edge of the body for rapid movement toward the perforate end.

11. An articulative sound-producing device comprising a cylinder with end caps, one of said caps being imperforate and the other perforate, and a weighty piston slidable in said cylinder and carrying a reed assembly, said piston having a body, a gasket, and a support washer, said body fitting said cylinder loosely and having a relieved edge at the end nearer the perforate cap, the gasket being mounted on said end and having a diameter very slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than the diameter of the gasket, the perforate end of said voice having secured thereto a valve member, and said piston having means cooperating with the valve member during movement of the piston to produce the desired articulation.

12. An articulative sound-producing device comprising a cardboard cylinder with sheet metal end caps, said caps having cylindrical portions fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a gasket, and a support washer, said body fitting said cardboard cylinder loosely and having a well-rounded edge at the end nearer the perforate cap, the gasket being mounted on said end and having a diameter only slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than the diameter of the gasket, the perforate end of said voice having secured thereto a valve member, and said piston having means cooperating with the valve member during movement of the piston to produce the desired articulation.

13. An articulative sound-producing device comprising a cylinder with end caps, one of said caps being imperforate and the other perforate, and a weighty piston slidable in said cylinder and carrying a reed assembly, said piston having a body, a gasket, and a support washer, said body fitting said cylinder loosely and having a relieved edge at the end nearer the perforate cap, the gasket being mounted on said end and having a diameter very slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than the diameter of the gasket, the perforate end of said voice having secured thereto a hollow cylindrical valve member with passages through the side wall thereof, and said piston having an opening which slidably surrounds the valve member during movement of the piston to produce the desired articulation.

14. An articulative sound-producing device comprising a cardboard cylinder with sheet metal end caps, said caps having cylindrical portion fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a gasket, and a support washer, said body fitting said cardboard cylinder loosely and having a well-rounded edge at the end nearer the perforate cap, the gasket being mounted on said end and having a diameter very slightly greater than that of the cylinder, said gasket being made of a very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than the diameter of the gasket and no smaller than the diameter of the body, the perforate end of said voice having secured thereto a hollow cylindrical valve member with sound discharge passages through the side wall thereof, and said piston having an opening which slidably surrounds the valve member during movement of the piston to produce the desired articulation.

15. An articulative sound-producing device comprising a cardboard cylinder with end caps, one of said caps being imperforate and the other perforate, and a weighty piston slidable in said cylinder and carrying a reed assembly, said piston having a body, a reed assembly, a gasket, and a support washer, said body fitting said cardboard cylinder loosely and having a relieved edge at the end nearer the perforate cap, the gasket being mounted on said end and having a diameter only slightly greater than that of the cylinder, said gasket being made of very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than the diameter of the gasket, the perforate end of said voice having secured thereto a hollow cylindrical valve member with sound discharge passages through the side wall thereof and said piston having an opening which slidably surrounds the valve member during movement of the piston, said piston having an annular gasket at said opening with its outer edge secured to the piston and its inner edge slidably fitting around said cylinder, said gasket being made of the same material as the first mentioned piston gasket.

16. An articulative sound-producing device comprising a cardboard cylinder with sheet metal end caps, said caps having cylindrical portions fitting within the cylinder to support the same, and having edges curled around the ends of the cylinder and into the outside of the cylinder opposite the aforesaid cylindrical portions, one of said caps being imperforate and the other perforate, and a weighty piston slidable in said cylinder and carrying a reed assembly, said piston having a body, a piston gasket, and a support washer, said body fitting said cardboard cylinder loosely and having a well-rounded edge at the end nearer the perforate cap, the gasket being mounted on said end and having a diameter only slightly greater than that of the cylinder, said gasket being made of very thin flexible non-porous sheet of material in a non-cupped flat condition such that the free edge of the gasket is a substantially flat thin edge which is free to yield to either side of the plane of the main body of the gasket, a thin metal support washer disposed in back of said gasket, said support washer having a diameter only slightly smaller than the diameter of the gasket and no smaller than that of the body, the perforate end of said voice having secured thereto a hollow cylindrical valve member with sound discharge passages through the side wall thereof, and said piston having an opening which slidably surrounds the valve member during movement of the piston, said piston having an annular valve gasket at said opening with its outer edge secured to the piston and its inner edge slidably fitting around said cylinder, said valve gasket being made of the same material as the piston gasket.

DAVID COHN.
CHARLES KUSOLD.

REFERENCES CITED

The following references are of record in the file of this patent:

UNITED STATES PATENTS

| Number | Name | Date |
|---|---|---|
| 1,453,527 | Schneider | May 1, 1923 |
| 1,466,877 | Grubman | Sept. 4, 1923 |
| 1,503,518 | Schneider | Aug. 5, 1924 |
| 1,565,723 | Evans | Dec. 15, 1925 |
| 1,642,956 | Hutnikow | Sept. 20, 1927 |
| 2,299,023 | Marcus | Oct. 13, 1942 |